United States Patent
Tseng et al.

[11] Patent Number: 5,930,544
[45] Date of Patent: Jul. 27, 1999

[54] LENS MOVEMENT MECHANISM FOR DIGITAL CAMERA

[75] Inventors: Kou-Long Tseng, Hsinchu; Chien-Chin Chan, Chupei; Guang-Shang Chang, Taichung; Chin-Shui Lin, YungHo; Chih-Wen Pan, Taipei; Chi-Wen Lin, Hsinchu, all of Taiwan

[73] Assignee: Umax Data Systems Inc., Hsinchu, Taiwan

[21] Appl. No.: 09/063,548

[22] Filed: Apr. 20, 1998

[51] Int. Cl.[6] .............................. G03B 17/12; H04N 5/225
[52] U.S. Cl. .............................................. 396/529; 348/374
[58] Field of Search .................................... 396/529, 439; 348/340, 369, 374, 211, 219

[56] References Cited

U.S. PATENT DOCUMENTS

| | | | |
|---|---|---|---|
| 4,769,711 | 9/1988 | Date | 348/374 |
| 5,557,329 | 9/1996 | Lim | 348/374 X |
| 5,815,759 | 9/1998 | Tseng et al. | 348/374 X |

*Primary Examiner*—W. B. Perkey
*Attorney, Agent, or Firm*—W. Wayne Liauh

[57] ABSTRACT

A lens movement mechanism for digital camera includes a lens set which has a composite lens and a Charged Couple Device built therein, a first movement member for turning the lens set angularly left or right, and a second movement member for turning the lens set angularly up or down. The first movement member includes a bracket piovtly holding the lens set and a gear set for turning the bracket and the lens set left or right angularly. The second movement member includes a slant block with a slope surface contact with a rear end of the lens set so that when the slant block is moved transversely, the lens set will be tilted up or down angularly. Therefore the lens set may be turned left or right, up or down smoothly and precisely without a user's hand moving the lens set directly. The lens may be prevented from hand smearing. Higher photo quality may be achieved.

22 Claims, 5 Drawing Sheets

LENS MOVEMENT MECHANISM FOR DIGITAL CAMERA

BACKGROUND OF THE INVENTION

1. Field of the Invention

This invention relates to a lens movement mechanism for digital camera (e.g., CCD camera) and particularly to a lens movement mechanism that can turn freely within a predetermined angle in a digital camera.

2. Description of the Prior Art

Conventional digital camera such as the one disclosed in U.S. Pat. No. 5,612,732 includes a moveable CCD camera lens which can rotate about a shaft (i.e., an one dimensional axis rotation). During operation of the CCD camera, a user has to use hand to move the lens directly. Such an aspect generally results in the following disadvantages:

1. The lens is prone to smear by the hand, and thus may result in poor image quality.
2. Hands movement is generally rough and rude. Adjustment by hand could easily be overdone with too strong force and is prone to damage the lens mechanism. Hand movement also creates vibration or dislocation of the camera, and makes fine tuning and precise positioning of the lens difficult.

Because of aforesaid shortcomings, conventional digital camera is mostly used in relatively low price product category. It is not suitable for high value products which require clean lens and precise fine tuning function.

SUMMARY OF THE INVENTION

In view of aforesaid problems and disadvantages, it is therefore an object of this invention to provide a lens movement mechanism for digital camera that can precisely fine-turn the lens up or down, and left or right without using hands moving the lens directly.

It is another object of this invention to provide a lens mechanism for digital camera that can fine tune the lens rotation angle precisely without a user's hand moving the lens so that the lens may be free from smearing and the camera may be prevented from excessive movement when focusing, and thus a high photo quality can be acquired.

A preferred embodiment of the lens movement mechanism according to this invention includes a lens set, a first movement means and a second movement means. The first movement means includes a bracket pivotly support the lens set and a gear set driven by a motor for turning the bracket and consequently the lens set left or right angularly. The second movement means includes a transverse guide, a strut vertically attached to the under surface of the guide, a movable slant block and a lug attached to the slant block. The rear end of the lens set is engageable with the guide. By moving the lug and the slant block transversely, the lens set may be moved up or down angularly. All this lens movement may be done precisely and smoothly without a user's hand touching the lens set directly. Therefore the lens may be prevented from swearing by the hands. The focusing operation may be performed without excessive camera motion and thus results in higher photo quality.

According to another aspect of this invention, the first movement means is generally structured like the one set forth above, but is dispensed with the motor. The gear set may consist of at least a first gear engageable with the bracket, and a second gear engageable with the first gear and has a portion extending outside the camera case. A user may turn the second gear by hand to rotate the bracket and the lens left or right angularly. The second movement means is constructed like the one set forth above. Hence the lens movement, up or down, and left or right, may be done by moving the second gear and the lug transversely. Such structure enables the camera be more compact and small size, and thus enhance its designing flexibility and user friendliness.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
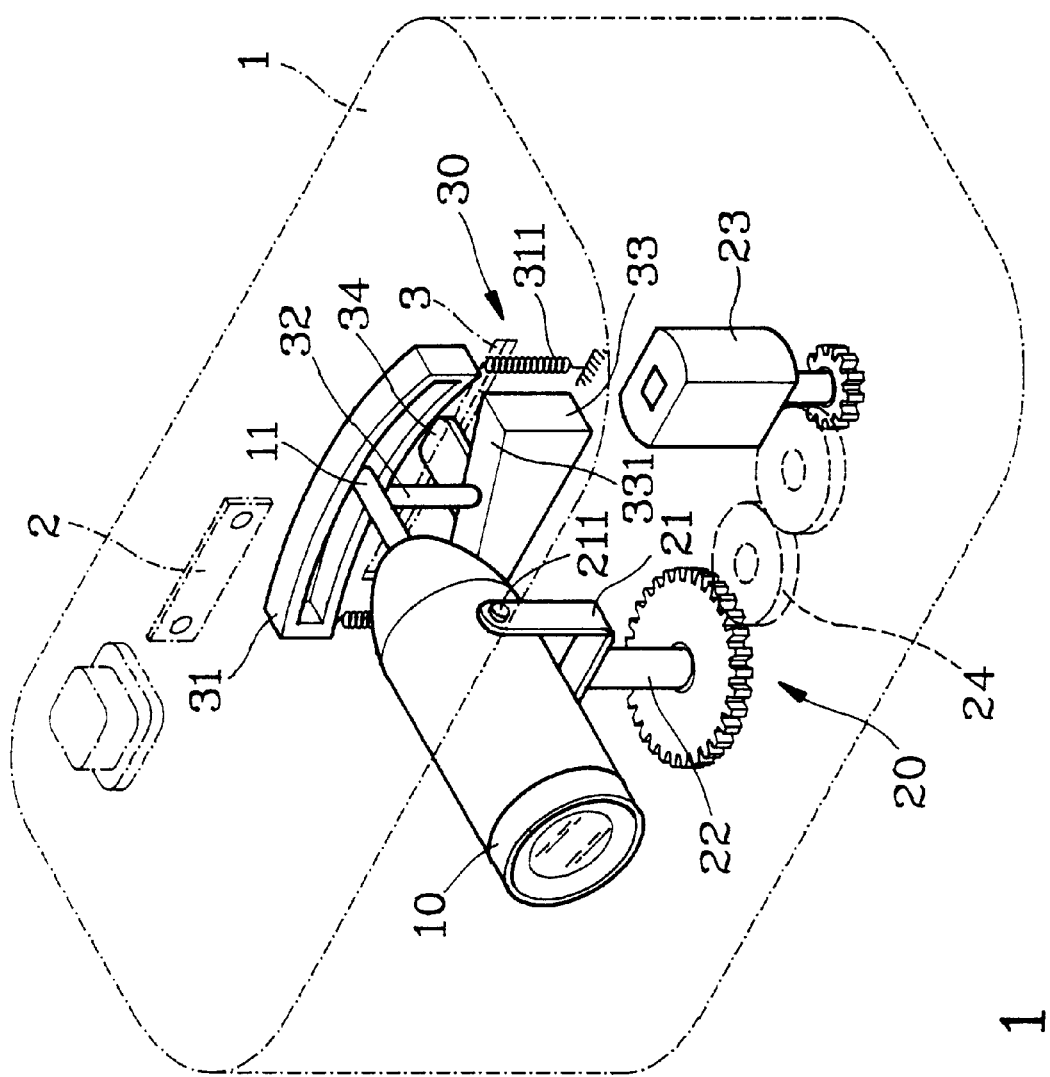
FIG. 1 is a perspective view of a preferred embodiment according to the present invention.
Figure 3:
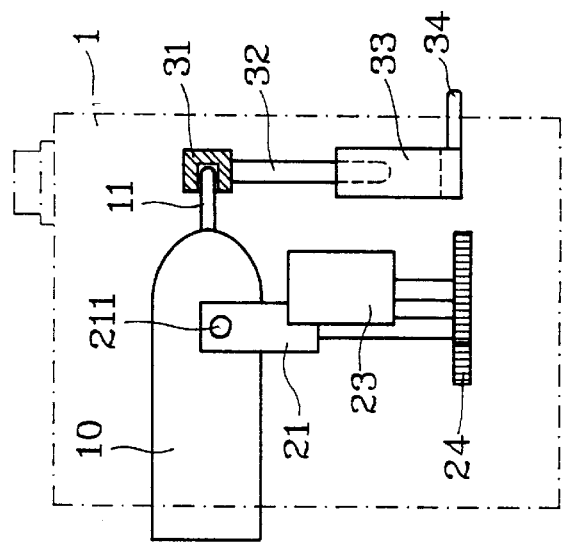
FIG. 3 is a side view of FIG. 1.
Figure 2:
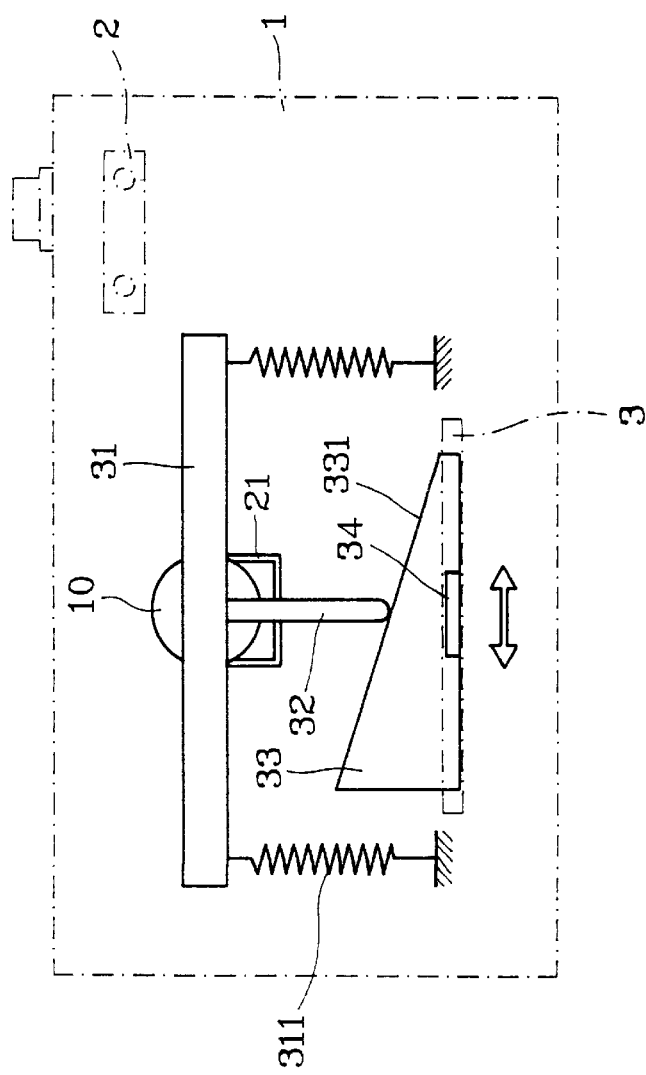
FIG. 2 is a rear view of FIG. 1.

Referring to FIGS. 1, 2 and 3, the lens movement mechanism of this invention is located in a case of a camera 1 (preferably a digital camera) and includes a lens set 10 which has a composite lens and a Charge Coupled Device (CCD) (not shown in the figures), a first movement means 20 for moving the lens set 10 angularly left or right, and a second movement means 30 for moving the lens set 10 angularly up or down.

The first movement means 20 includes a bracket 21, a gear set (preferably a reducing gear) 24 and a motor 23. The bracket 21 is an U-shaped frame pivotly holding a middle portion of the lens set 10 at two lateral sides via a pair of spaced pivotal pins 211 located at the top ends of the U-shaped frame. The lens set 10 is furnished within the camera case 1 while having a front end thereof extending out of the camera case 1. There is a vertical shaft 22 under the U-shaped bracket 21. The bottom end of the shaft 22 engages with one gear of the gear set 24. The motor 23 is engaged with another gear of the gear set 24 such that when the motor 23 is actuated, the gear set 24 will be driven so as to rotate the shaft 22 consequently. On the outside surface of the camera case 1, there is a control button 2 wiring to he motor 23. Pressing the control button 2, the motor 23 will rotate transversely left or right and thus drives the gear set 24, the shaft 22 and consequently the lens set 10 left or right angularly without using hand to move the lens set.

The second movement means 30 includes a curve-shaped guide 31 which extends horizontally, a strut 32 vertically attached to the bottom of guide 31 in a T-shape manner, a slant block 33, and a lug 34 horizontally attached to the slant block 33 and projecting rearward and extending outside the camera case 1 via a slot 3 formed on the camera case 1. The lens set 10 has a bar 11 attached to a rear end thereof. The free end of the bar 11 is engageable with a trough formed in the guide 31. The slant block 33 has a slope surface 331 constantly in contact with the bottom end of the strut 32 because of tension force of a pair of elastic members 311(tension springs preferred) attached to two ends of the guide 31. By moving the lug 34 left or right, the slope surface 331 will move the strut 32 and the guide 31 up or down, consequently the bottom end of the lens set 10 will be moved up or down so as to rotate the lens set 10 angularly about the pivotal pins 211. Thus the lens set 10 may be moved angularly up or down, left or right precisely and smoothly without a user's hand touching the lens set. The lens may be kept clean. All these features will help to produce high quilty photo.

The embodiments illustrated hereunder generally have a structure similar to the one shown in FIG. 1. Therefore same numerals will be marked for same type of elements.

Figure 4:
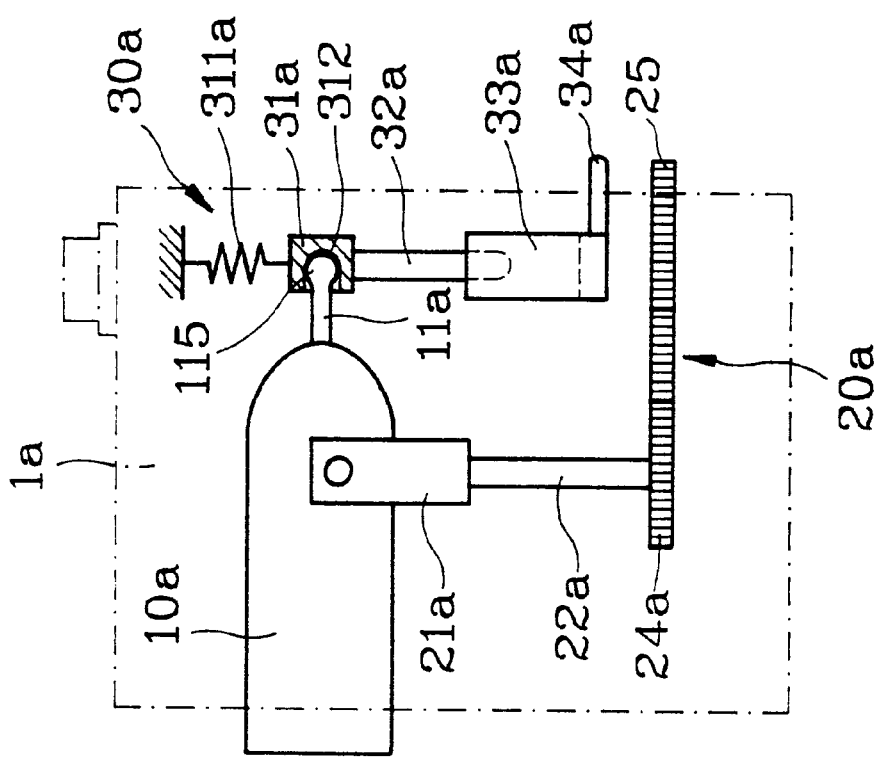
FIG. 4 is a side view of another embodiment of this invention.

FIG. 4 illustrates another embodiment of this invention. Comparing with the first embodiment shown in FIG. 1, it also has a lens set 10a, a first movement means 20a and a second movement means 30a. However it is operated manually rather than driven by a motor.

The second movement means 30a, likes the one (30) shown in FIG. 1, includes a transverse guide 31a, a vertical strut 32a attached to the bottom of the guide 31a to form a T-shaped structure, a slant block 33a with a slope surface contact with the bottom end of the strut 32a and a lug 34a attached to a lateral side of the slant block 33 and projected outside the camera case 1a. There are also a pair of elastic members 311a for keeping the strut 32a to make constant contact with the slant block 33a. But instead of locating below the guide 31a with tension force, the elastic members 311a are located above the guide 31a with compression force.

The bar 11a behind the lens set 10a has a spherical rear end 115 engageable with a curve-shaped trough 312 in the guide 31a so that when the guide 31a is moved up or down, the rear end 115 of the bar 11a may keep engaging within the trough 312 more smoothly. The lens set 10a will also be titled down or up more smoothly.

The first movement means 20a shown in FIG. 4 includes a U-shaped bracket 21a for pivotly holding the lens set 10a, a shaft 22a attached to the bottom of the bracket 21 and a gear set 24a which consisting of at least a first gear and a second gear 25. The first gear attached to the bottom end of the shaft 22a. The second gear 25 has a portion extending outside the camera case 1a. Therefore by manually turning the second gear 25, the first gear, the shaft 22a, bracket 21 a and consequently the lens set 10a may be turned to rotate left or right. When moving the lug 34a left or right, the slant block 33a will push the strut 32a up or down, which in turn will tilt the front end of the lens set 10a down or up pivotly. As both the lug 34a and the second gear 25 are being moved horizontally when in use, the whole structure may be made compact and small size.

Figure 6:
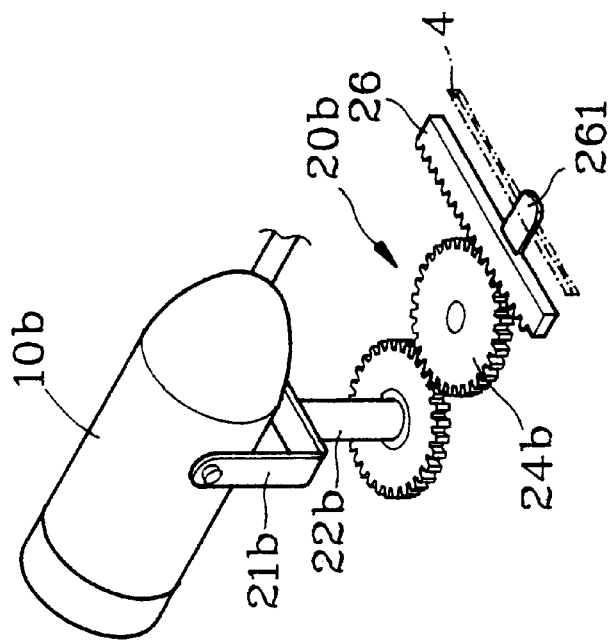
FIG. 6 is a fragmentary perspective view of a first movement means shown in FIG. 5.
Figure 5:
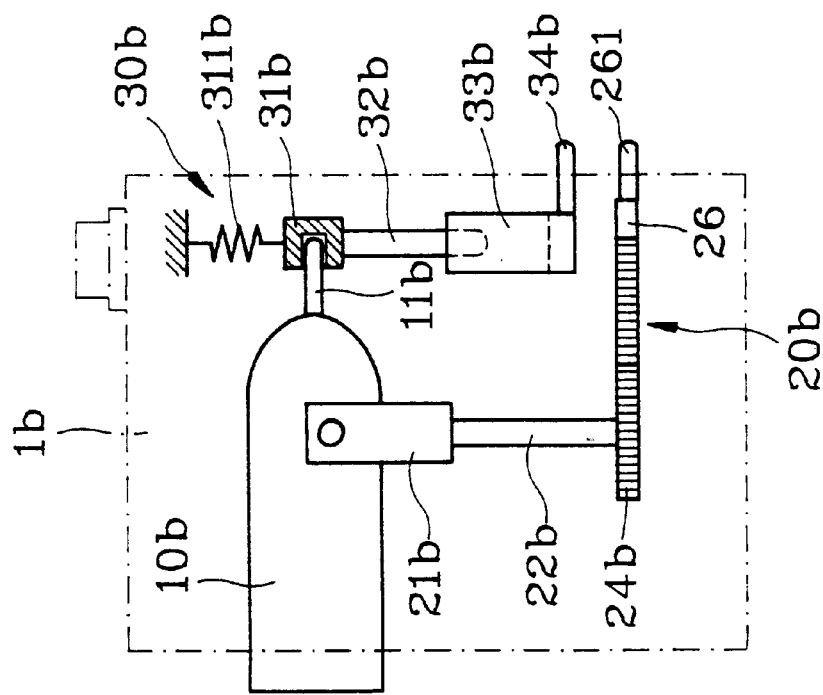
FIG. 5 is a side view of yet another embodiment of this invention.

FIGS. 5 and 6 show yet another embodiment of the present invention. It is substantially constructed like the one shown in FIG. 4 except that in the first movement means 20b, there is gear rack 26 engageable with the gear set 24b. The gear rack 26 has a handle 261 extending outside the camera case 1b through a slot 4 formed in the camera case 1b. Therefore by moving the handle 261 horizontally left or right, the gear set 24b will be turned, consequently the lens set 10b will be turned left or right angularly about the shaft 22b. The up or down movement of the lens set 10b is substantially done the same way shown in FIG. 4, and therefore is omitted here.

Figure 7:
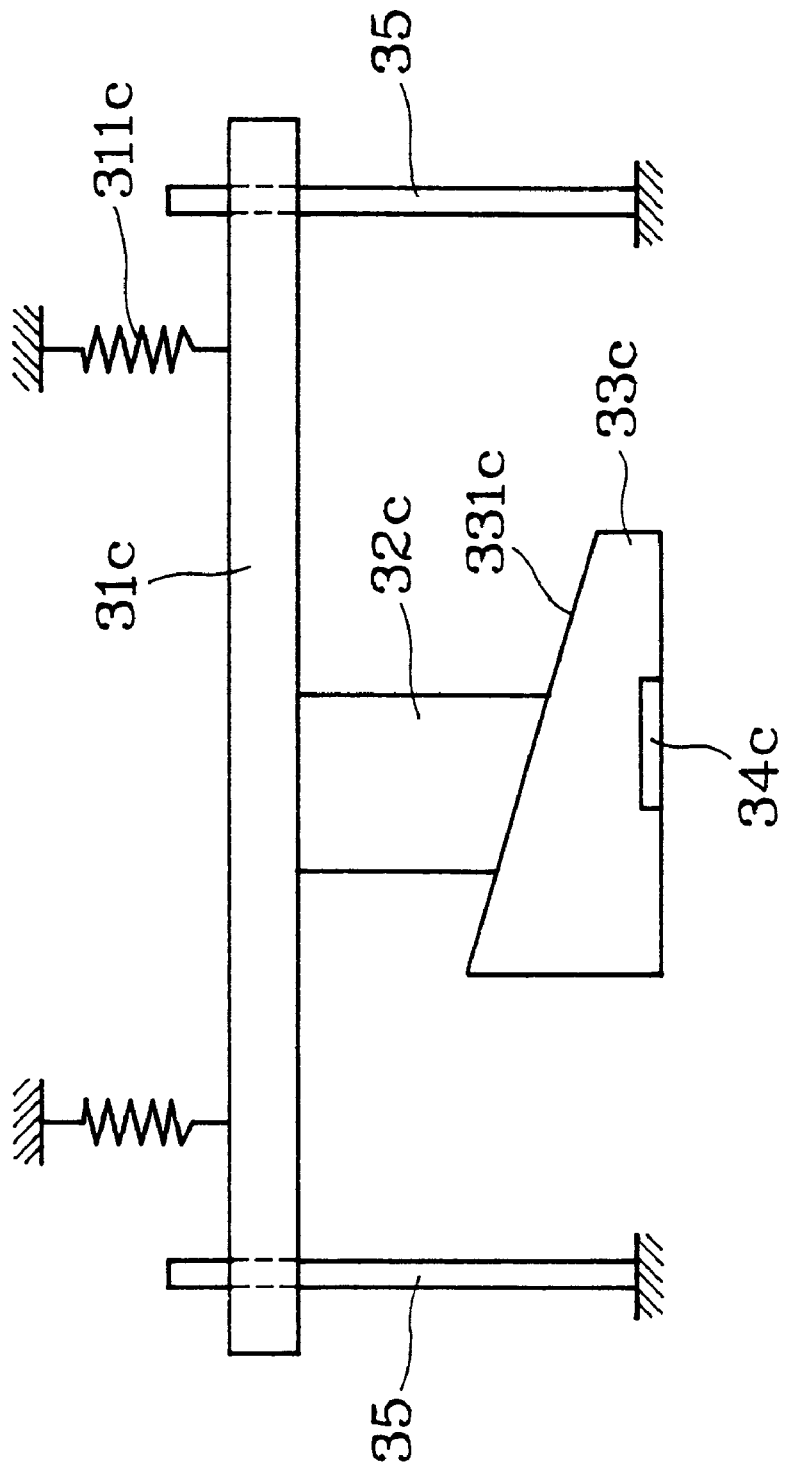
FIG. 7 is a rear fragmentary view of a further embodiment of a second movement means.

FIG. 7 shows yet a further embodiment of the second movement means of the present invention. The second movement means shown in FIG. 7 also includes a transverse guide 31c, a vertical strut 32c attached to the guide 31c, a slant block 33c with a slope surface 331c contact with the bottom end of the strut 32c, a lug 34c attached to a lateral side of the slant block 33c and a pair of elastic members 311c. The strut 32c under the guide 31c has a sloped bottom edge movably mating with the slope surface 331c of the slant block 33c. There are also a pair of spaced and vertical pillars 35 running through the guide 31c at both ends so that when the lug 34c is moved left or right, the up or down movement of the guide 31c will be performed more smoothly and steadily without tilting sideward. Of course, this structure may be applied equally well to all other embodiments shown in FIG. 1 through FIG. 6.

It may thus be seen that the objects of the present invention set forth herein, as well as those made apparent from the foregoing description, are efficiently attained. While the preferred embodiments of the invention have been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A lens movement mechanism for digital camera, comprising:

a camera case;

a lens set furnished within the camera case, said lens set having a front end thereof extending out of the camera case;

a first movement means including a bracket for pivotally holding the lens set, a gear set engageable with a shaft vertically located under the bracket and a motor engageable with the gear set for driving the bracket and the lens set rotating about the shaft in a transverse direction; said lens set being pivotally engaged with said bracket and capable to swing vertically in a limited degree; and a second movement means including a transverse guide engageable with a rear end of the lens set, the guide having a strut vertically attached to a bottom surface thereof, a movable slant block having a slope surface engageable with a bottom end of the strut, and a lug fixedly attached to the slant block for moving the slant block along a transverse direction such that the strut is driven by the slope surface of the slant block to move vertically, and consequently the the lens set is swung vertically.

2. A lens movement mechanism of claim 1, wherein the gear set is a reducing gear.

3. A lens movement mechanism of claim 1, wherein the bracket is a U-shaped frame pivotly holding the lens set at two lateral sides in a middle portion and has a shaft attached to a bottom thereof, the shaft having a bottom end engaged with a gear of the gear set so that the shaft and the bracket is turnable by the gear set.

4. A lens movement mechanism of claim 1, wherein the lens set has a bar attached to a rear end thereof, the guide being shaped in a curve and having a trough formed therein engageable with said rear end of the bar when the rear end of the lens set being moved transversely.

5. A lens movement mechanism of claim 1, wherein the strut attaches to the bottom surface of the guide at a middle portion and forms a T-shaped manner.

6. A lens movement mechanism of claim 1 further having a control button located on the camera for controlling the motor operation.

7. A lens movement mechanism of claim 1, wherein the camera has a transverse slot enabling the lug running therethrough to slide transversely therein.

8. A lens movement mechanism of claim 1 further having a pair of spaced and vertical pillars running through both ends of the guide for guiding the guide to move vertically in a smooth and steady manner without tilting sideward.

9. A lens movement mechanism of claim 1 further having a pair of elastic members furnished at both ends of the guide for keeping the strut contact with the slope surface of the slant block constantly.

10. A lens movement mechanism of claim 9, wherein the elastic members are springs.

11. A lens movement mechanism of claim 4, wherein the rear end of the bar is spherical and is engageable smoothly with an U-shaped and transverse trough formed in the guide when the guide is moved vertically.

12. A lens movement mechanism for digital camera, comprising:

a camera case;

a lens set furnished within the camera case, said lens set having a front end thereof extending out of the camera case;

a first movement means including a bracket pivotly holding the lens set and a gear set, the gear set having at least a first gear engageable with a shaft vertically located under the bracket and a second gear for turning the bracket and the lens set rotating about the shaft in a transverse direction; said lens set being pivotally engaged with said bracket and capable to swing vertically in a limited degree; and a second movement means including a transverse guide engageable with a rear end of the lens set, the guide having a strut vertically attached to a bottom surface thereof, a movable slant block having a slope surface engageable with a bottom end of the strut, and a lug fixedly attached to the slant block for moving the slant block along a transverse direction such that the strut is driven by the slope surface of the slant block to move vertically, and consequently the the lens set is swung vertically.

13. A lens movement mechanism of claim 12, wherein the second gear is partly located outside of the camera.

14. A lens movement mechanism of claim 12, wherein the second gear is partly located outside of the camera, the bracket is a U-shaped frame pivotly holding the lens set at two lateral sides in a middle portion and has a shaft attached to a bottom thereof, the shaft having a bottom end engaged with the first gear of the gear set so that the shaft and the bracket is turnable by the gear set.

15. A lens movement mechanism of claim 12, wherein the lens set has a bar attached to a rear end thereof, the guide being shaped in a curve and having a trough formed therein engageable with a rear end of the bar when the lens set being swung transversely.

16. A lens movement mechanism of claim 15, wherein the rear end of the bar is spherical and is engageable smoothly with a U-shaped and transverse trough formed in the guide when the guide is moved vertically.

17. A lens movement mechanism of claim 12, wherein the strut attaches to the bottom surface of the guide at a middle portion and forms a T-shaped manner.

18. A lens movement mechanism of claim 12, wherein the camera has a transverse slot enabling the lug running therethrough to slide therein.

19. A lens movement mechanism of claim 12 further having a pair of elastic members at both ends of the guide for keeping the strut contact with the slope surface of the slant block constantly.

20. A lens movement mechanism of claim 19, wherein the elastic members are springs.

21. A lens movement mechanism of claim 12 further having a gear rack engageable with the second gear, the gear rack having a handle extending outside the camera case for moving the gear rack transversely to turn the second gear.

22. A lens movement mechanism of claim 12, further having a pair of spaced and vertical pillars running through both ends of the guide for guiding the guide to move vertically in a smooth and steady manner without tilting sideward.

* * * * *